US012683338B1

(12) United States Patent
  Zheng

(10) Patent No.: US 12,683,338 B1
(45) Date of Patent: Jul. 14, 2026

(54) MULTI-FUNCTIONAL CHARGING DATA CABLE AND CHARGING DEVICE

(71) Applicant: SHENZHEN YinChen TECHNOLOGY CO., LTD., Shenzhen (CN)

(72) Inventor: Yonglin Zheng, Shenzhen (CN)

(73) Assignee: SHENZHEN YinChen TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/449,484

(22) Filed: Jan. 15, 2026

(51) Int. Cl.
  H01R 13/73 (2006.01)
  H02J 7/70 (2026.01)
(52) U.S. Cl.
  CPC .............. H01R 13/73 (2013.01); H02J 7/731 (2026.01)
(58) Field of Classification Search
  CPC ................................. H01R 13/73; H02J 7/731
  USPC .................................................. 439/502, 534
  See application file for complete search history.

(56) References Cited

U.S. PATENT DOCUMENTS

| | | | |
|---|---|---|---|
| 8,376,782 B2 * | 2/2013 | Govekar | H01R 25/006 |
| | | | 439/502 |
| 8,790,125 B1 * | 7/2014 | Lee | H01R 13/447 |
| | | | 439/502 |
| 2014/0154908 A1 * | 6/2014 | Magno | H02S 40/30 |
| | | | 439/502 |

* cited by examiner

*Primary Examiner* — Gary F Paumen
(74) *Attorney, Agent, or Firm* — Zhigang Ma

(57) ABSTRACT

A multi-functional charging data cable is provided, including: a connector provided with a first connecting plug; a connecting wire, where a first end of the connecting wire is connected to the connector; and a connecting rod including a body rod, where a first end of the body rod is connected to a second end of the connecting wire away from the connector; a support rod pivotally connected to the body rod within a first plane; and a second connecting plug arranged at a middle portion of the body rod and perpendicular to the first plane. The second connecting plug is electrically connected to the first connecting plug through the body rod and the connecting wire, and is configured to be adaptively connected to a connecting socket of an electronic device.

10 Claims, 4 Drawing Sheets

100

MULTI-FUNCTIONAL CHARGING DATA CABLE AND CHARGING DEVICE

TECHNICAL FIELD

The present disclosure relates to the technical field of charging data cables, and more specifically, to a multi-functional charging data cable with charging, data transmission, and supporting functions, and a charging device including the multi-functional charging data cable.

BACKGROUND

With the development of scientific and technological level, the application of electronic devices is increasingly widespread. One of the common scenarios for the electronic devices is to use a charging data cable for charging or data transmission.

At present, a conventional charging data cable has a single function. During charging or data transmission of an electronic device through the cable, it is inconvenient to expand and use the electronic device because of a limited space. As a result, a user has a poor experience. It is necessary to provide an improved technical solution.

SUMMARY

In view of the above contents, the present disclosure aims to at least solve one of the technical problems in the prior art. To this end, the present disclosure provides a multi-functional charging data cable. By arrangement of a connecting rod with a body rod, a support rod, and a second connecting plug, the second connecting plug implements electrical connection with an electronic device. The body rod corresponds to a connecting end surface of the electronic device. The support rod pivotally moves away from the body rod, thereby implementing a supporting structure on the electronic device and expanding usage scenarios of the electronic device.

To this end, in a first aspect, an embodiment of the present disclosure provides a multi-functional charging data cable, including:

a connector provided with a first connecting plug;

a connecting wire, where a first end of the connecting wire is connected to the connector; and a connecting rod including:

a body rod, where a first end of the body rod is connected to a second end of the connecting wire away from the connector;

a support rod pivotally connected to the body rod within a first plane; and a second connecting plug arranged at a middle portion of the body rod and perpendicular to the first plane, where the second connecting plug is electrically connected to the first connecting plug through the body rod and the connecting wire, and is configured to be adaptively connected to a connecting socket of an electronic device;

the body rod is able to match a connecting end surface of the electronic device; and the support rod is able to be pivotally spread to form a supporting structure.

Preferably, the body rod is provided with a connecting surface; the second connecting plug is arranged on the connecting surface; and the connecting surface is configured to abut against the connecting end surface of the electronic device.

Preferably, the connecting surface is provided with an anti-slip structure for increasing friction with the electronic device; and/or, the connecting surface is provided with a downwards recessed structure extending lengthwise, to receive the connecting end surface of the electronic device.

Preferably, the second connecting plug includes a connecting platform protruding from the body rod and a plug portion arranged on the connecting platform; the connecting platform is configured to abut against the connecting end surface of the electronic device; and/or, the body rod is further provided with a supporting surface facing away from the connecting surface, and the supporting surface is provided with an anti-slip structure.

Preferably, a first end of the support rod is pivotally connected to the body rod; and a second end of the support rod is a free end and is able to pivot away from or toward the body rod.

Preferably, a pivotal connection point between the first end of the support rod and the body rod is located between the first end and the middle portion of the body rod; and/or, the support rod is pivotally connected to the body rod through a shaft pin.

Preferably, the body rod is provided with a receiving structure matching the support rod.

Preferably, a thickened operating block is arranged at the second end of the support rod, and the receiving structure is correspondingly provided with a receiving slot.

Preferably, the first connecting plug is configured as one of a universal serial bus (USB) plug or a Type-C plug; and/or, the second connecting plug is configured as one of a Micro USB plug, a Lightning plug, or a Type-C plug.

In a second aspect, the present disclosure further provides a charging device, including the multi-functional charging data cable described in the first aspect and a power adapter. The power adapter is provided with a connecting socket matching the first connecting plug.

The present disclosure provides the multi-functional charging data cable. By the arrangement of the connecting rod matching the electronic device and specifically including the body rod corresponding to the electronic device, the second connecting plug electrically connected to the electronic device, and the support rod pivotally connected to the body rod, charging or data transmission on the electronic device is implemented, and a supporting structure can be formed. This expands other usage scenarios for the electronic device, such as watching videos and movies. Meanwhile, it is also conductive to heat dissipation of the electronic device. The multi-functional charging data cable is convenient to operate and high in applicability and extensibility, and provides a good experience for a user.

DETAILED DESCRIPTION OF THE EMBODIMENTS

Figure 1:
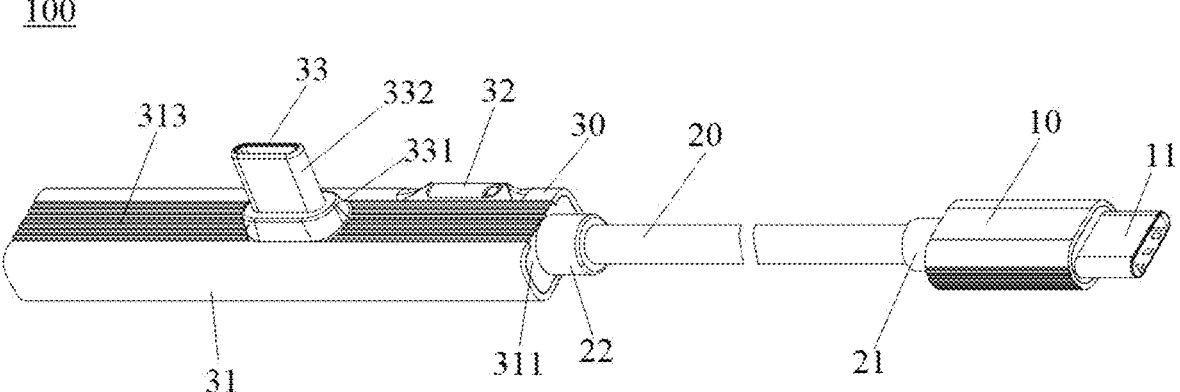
FIG. 1 is a schematic diagram of a three-dimensional structure of a multi-functional charging data cable provided by an embodiment of the present disclosure.
Figure 2:
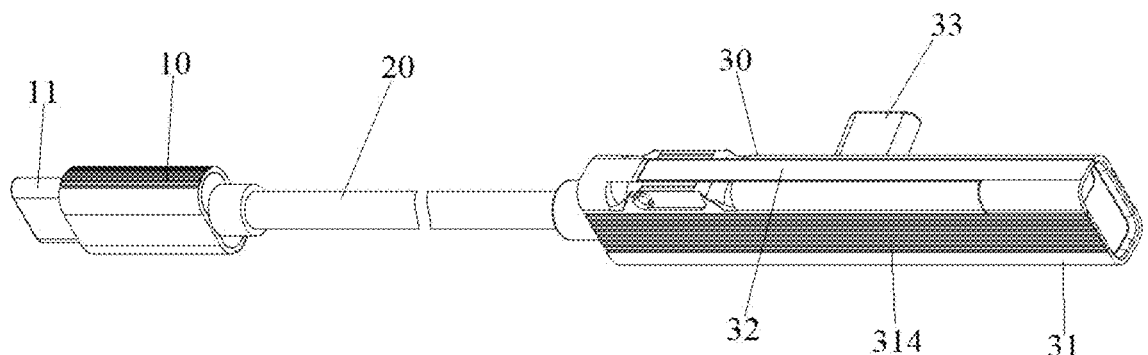
FIG. 2 is a schematic diagram of a three-dimensional structure of the multi-functional charging data cable in FIG. 1, viewed in another angle.
Figure 3:
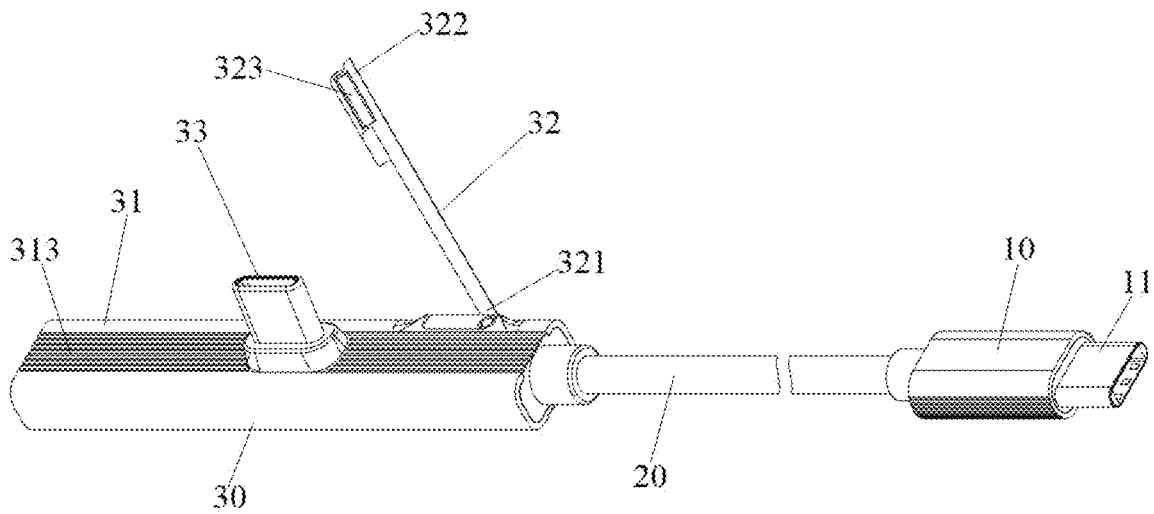
FIG. 3 is a schematic diagram of a three-dimensional structure of the multi-functional charging data cable in FIG. 1, in a second state.
Figure 4:
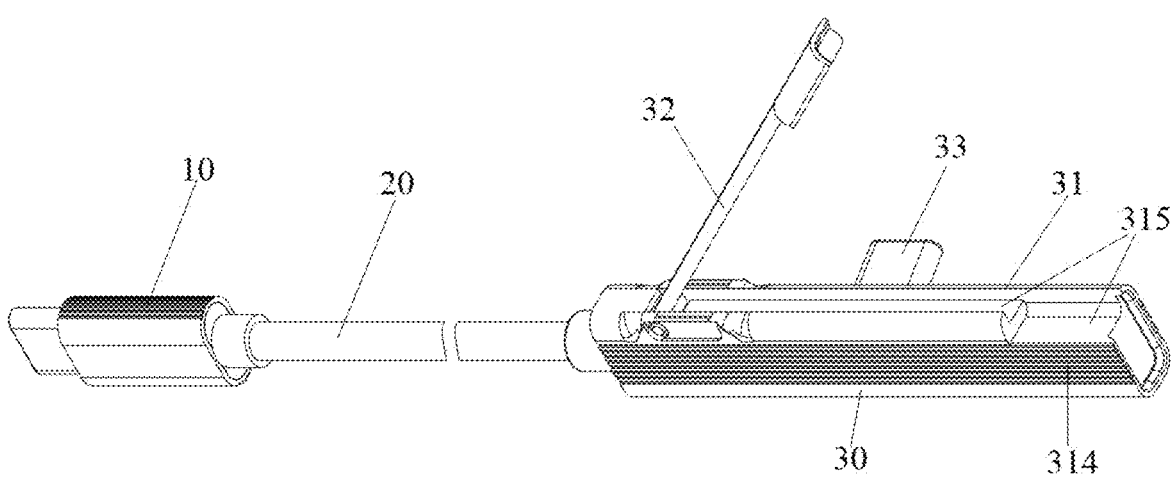
FIG. 4 is a schematic diagram of a three-dimensional structure of the multi-functional charging data cable in FIG. 3, viewed in another angle.

The embodiments of the present disclosure are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary, aim to explain the present disclosure, and should not be construed as a limitation on the present disclosure.

The following disclosure provides many different embodiments or examples to implement different structures of the present disclosure. To simplify the disclosure of the present disclosure, components and settings of specific examples are described below. Certainly, they are merely examples and are not intended to limit the present disclosure. In addition, the present disclosure may repeatedly refer to numbers and/or letters in different examples. Such repetition is for purposes of simplicity and clarity and does not itself indicate a relationship between the various embodiments and/or settings discussed. In addition, the present disclosure provides examples of various specific processes and materials, but a person of ordinary skill in the art will recognize the application of other processes and/or the use of other materials.

Referring to FIG. 1, FIG. 3, FIG. 5, and FIG. 6, the present disclosure aims to provide a multi-functional charging data cable 100 configured to be used with an electronic device 200. The electronic device 200 may be a mobile phone, a tablet, or the like. The mobile phone is used as an example in the following embodiments. The multi-functional charging data cable 100 provides a stable structure support in a process of implementing charging or data transmission on the electronic device 200, and can implement expansion use of the electronic device 200. Furthermore, a heat dissipation effect on the electronic device 200 can be enhanced.

Referring to FIG. 1 to FIG. 4, the multi-functional charging data cable 100 includes: a connector 10 provided with a first connecting plug 11;

a connecting wire 20, where a first end 21 of the connecting wire 20 is connected to the connector 10; and a connecting rod 30 including a body rod 31, where a first end 311 of the body rod 31 is connected to a second end 22 of the connecting wire 20 away from the connector 10; a support rod 32 pivotally connected to the body rod 31 within a first plane; and a second connecting plug 33 arranged at a middle portion of the body rod 31 and perpendicular to the first plane. The second connecting plug 33 is electrically connected to the first connecting plug 11 through the body rod 31 and the connecting wire 20, and is configured to be adaptively connected to a connecting socket of the electronic device 200. The body rod 31 can match a connecting end surface 201 of the electronic device 200. The support rod 32 can be pivotally spread to form a supporting structure.

In this embodiment, the connecting rod 30 corresponds to the electronic device 200. The body rod 31 corresponds to the connecting end surface 201 of the electronic device 200. The second connecting plug 33 is correspondingly connected to a connecting socket of the electronic device 200. This achieves electrical interface connection and forms a relatively integrated connecting structure, ensuring a compact and coherent configuration. In addition, through the pivoted support rod 32, a supporting structure for the electronic device 200 can be achieved in an open state, and a pivoting structure also ensures operation convenience in this state.

The body rod 31 matches the electronic device 200. In one case, the body rod 31 fits the connecting end surface 201 of the electronic device 200. In another case, a position of the body rod 31 corresponds to the connecting end surface 201 of the electronic device 200, without fitting. However, in both cases, the body rod 31 and the electronic device 200 maintain overall continuity, without forming a redundant structure.

Further, the body rod 31 is provided with a connecting surface 313. The second connecting plug 32 is arranged on the connecting surface 313. The connecting surface 313 is configured to abut against the connecting end surface 201 of the electronic device 200. In this embodiment, the body rod 31 is provided with the connecting surface 313 that abuts against the connecting end surface 201 of the electronic device 200, so that a connecting structure between the connecting rod 30 and the electronic device 200 is more stable. This prevents an unstable electrical connection at an interface due to shaking during supporting.

Further, the connecting surface 313 is provided with an anti-slip structure configured to abut against the connecting end surface 201 of the electronic device 200. In this embodiment, the abutment against the electronic device 200 is implemented through the anti-slip structure, which further increases relative friction, thus limiting displacement of the electronic device 200 relative to the connecting rod 30 from causing an unstable connection. The anti-slip structure is configured as an anti-slip stripe extending in a lengthwise direction. It can be understood that the anti-slip structure is not limited to a lengthwise anti-slip stripe, but it can be a transverse striped structure, an arrayed anti-slip protrusion structure, or the like.

Optionally, the connecting surface 313 is provided with a downwards recessed structure extending lengthwise. The downwards recessed structure can receive the connecting end surface 201 of the electronic device 200. In this embodiment, the connecting end surface 201 is configured as the downwards recessed structure, which can correspondingly receive the connecting end surface 201 of the electronic device 200 and form a wrap-around structure. This further enhances stability of connection between them.

In another embodiment, the second connecting plug 33 includes a connecting platform 331 protruding from the body rod 31 and a plug portion 332 arranged on the connecting platform 331. The connecting platform 331 is configured to abut against the connecting end surface 201 of the electronic device 200. In this embodiment, the second connecting plug 33 is provided with the connecting platform 331 that protrudes relative to the body rod 31, thereby forming a gap between the connecting surface 313 and the connecting end surface 201 of the electronic device 200. In this way, it can correspondingly match the electronic device 200 with a protective shell. The protective shell fills the corresponding gap, so that the connecting rod 30 and the electronic device 200 maintain stably connected.

Optionally, the body rod 31 is further provided with a supporting surface 314 facing away from the connecting surface 313, and the supporting surface 314 is provided with an anti-slip structure. It can be understood that the supporting surface 314 is configured to be supported on a desktop in a state, and the arrangement of the anti-slip structure helps improve supporting stability.

Further, a first end 321 of the support rod 32 is pivotally connected to the body rod 31. A second end 322 of the support rod 32 is a free end and can pivot away from or toward the body rod 31. In this embodiment, the first end 321 of the support rod 32 is pivotally connected to the body rod 31, and the entire support rod 32 is pivotally connected to one side of the body rod 31. In a supporting state, a display side of the electronic device 200 will not be blocked. It can be understood that in other embodiments, it is not limited that the first end 321 of the support rod 32 is connected to the body rod 31, or the middle portion of the support rod 32 can be connected to the body rod 32, as long as a pivoting structure within the first plane is formed.

In addition, the rotational connection between the support rod 32 and the body rod 31 is configured as damping connection, so that rotation can be controlled to stop at different angles relative to the body rod. A preferred angle range is 10° to 80°, and the support rod 32 can specifically stop at an angle such as 20°, 30°, 45°, 60°, 75°, or 80° relative to the body rod.

Further, a pivotal connection point between the first end 321 of the support rod 32 and the body rod 31 is located between the first end 311 and the middle portion of the body rod 31. With this configuration, when the electronic device is placed horizontally, the connecting wire 20 extends from an upper side of the connecting rod 30. The support rod 30 can extend downwards to provide a stable supporting structure. Specifically, the pivotal connection point is closer to the first end 311 of the body rod 31, thereby providing a larger effective rotation region and forming a larger supporting structure.

Further, the support rod 32 is pivotally connected to the body rod 31 through a shaft pin.

Further, the body rod 31 is provided with a receiving structure 315 matching the support rod 32. This facilitates formation of a complete structure together with the body rod 31 when the support rod 32 is folded.

Further, a thickened operating block 323 is arranged at the second end 322 of the support rod 32, and the receiving structure 315 is correspondingly provided with a receiving slot 316 corresponding to the operating block 323. In this way, it is conductive to performing a gripping operation on the support rod 32 during pivoting.

Optionally, the first connecting plug 11 is configured as one of a USB plug or a Type-C plug.

Optionally, the second connecting plug 33 is configured as one of a Micro USB plug, a Lightning plug, or a Type-C plug.

Figure 5:
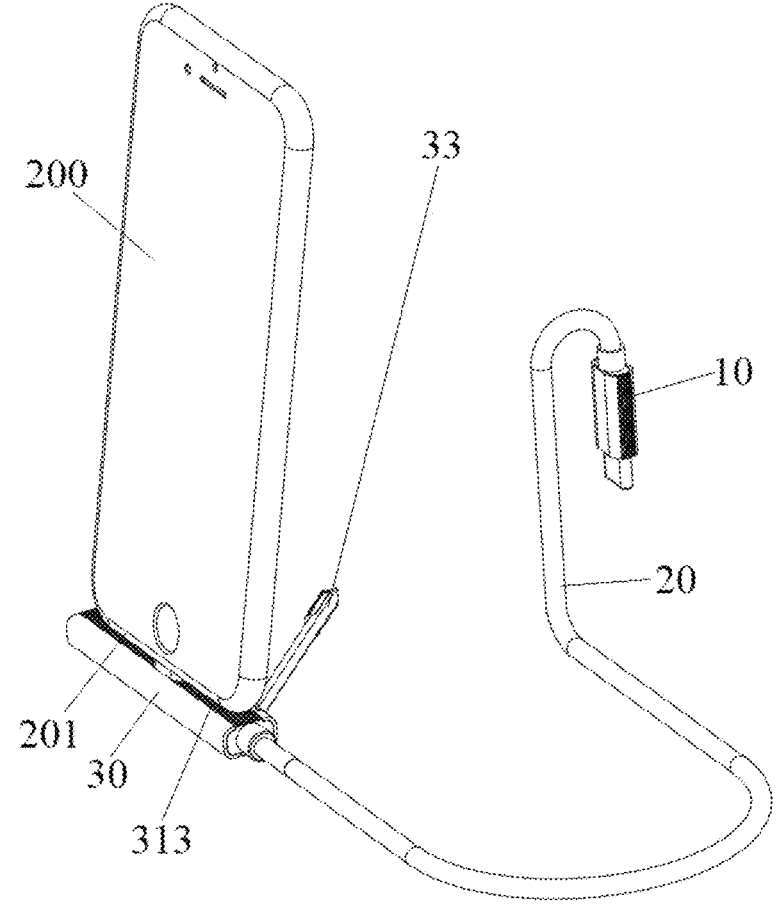
FIG. 5 is a schematic diagram of the multi-functional charging data cable in FIG. 1, in a first state.
Figure 6:
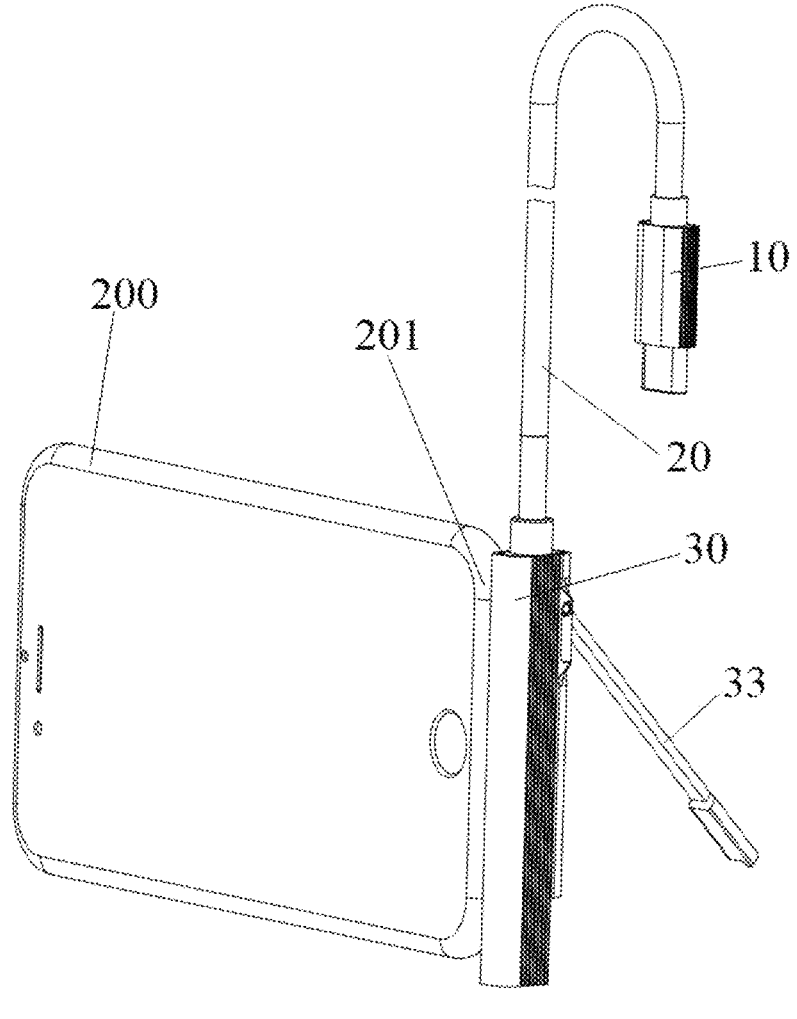
FIG. 6 is a schematic diagram of the multi-functional charging data cable in FIG. 1, in a second usage state.

Referring to FIG. 5 and FIG. 6, in a use state of the multi-functional charging data cable 100 or a charging device provided by the present disclosure, the support rod 32 is pivotally opened to form an angle with the body rod 31, to support the electronic device 200 to be longitudinally or horizontally placed as a support, so that the electronic device 200 can be further used for expansion and use during charging or data transmission, such as watching videos and movies. Even in a case of not requiring high-intensity expansion and use, the electronic device 200 can still generate heat and undergo temperature rise during continuous charging or data transmission. Compared with the conventional placed state, the supporting state of the electronic device 200 can also enhance the heat dissipation effect.

In a second aspect, the present disclosure further provides a charging device, including the multi-functional charging data cable 100 described in the first aspect and a power adapter (not shown). The power adapter is provided with a connecting socket matching the first connecting plug 11.

The present disclosure provides the multi-functional charging data cable 100. By the arrangement of the connecting rod 30 matching the electronic device 200 and specifically including the body rod 31 corresponding to the electronic device 200, the second connecting plug 33 electrically connected to the electronic device 200, and the support rod 32 pivotally connected to the body rod 31, charging or data transmission on the electronic device is implemented, and a supporting structure can be formed. This expands other usage scenarios for the electronic device 200, such as watching videos and movies. The multi-functional charging data cable is convenient to operate and high in applicability and extensibility, and provides a good experience for a user.

In the description of this specification, the description referring to the terms "an embodiment", "some embodiments", "example", "specific examples", "some examples", or the like means that specific features, structures, materials or characteristics described in connection with the embodiments or examples are included in at least one embodiment or example of the present disclosure. In this specification, the schematic representations of the above terms are not necessarily intended to refer to the same embodiment or example. Furthermore, the specific features, structures, materials or characteristics described may be combined in any suitable manner in any one or more embodiments or examples. In addition, those skilled in the art may combine the different embodiments or examples described in this specification, as well as the features of different embodiments or examples, without mutual contradictions.

Although the embodiments of the present disclosure have been shown and described, it can be understood by those of ordinary skill in the art that various changes, modifications, substitutions, and variations can be made to these embodiments without departing from the principle and purpose of the present disclosure. The scope of the present disclosure is defined by the claims and their equivalents.

What is claimed is:

1. A multi-functional charging data cable, comprising:
   a connector provided with a first connecting plug;
   a connecting wire, wherein a first end of the connecting wire is connected to the connector; and
   a connecting rod comprising:
   a body rod, wherein a first end of the body rod is connected to a second end of the connecting wire away from the connector;
   a support rod pivotally connected to the body rod within a first plane; and
   a second connecting plug arranged at a middle portion of the body rod and perpendicular to the first plane, wherein the second connecting plug is electrically connected to the first connecting plug through the body rod and the connecting wire, and is configured to be adaptively connected to a connecting socket of an electronic device;
   the body rod is allowed to match a connecting end surface of the electronic device; and
   the support rod is allowed to be pivotally spread to form a supporting structure.

2. The multi-functional charging data cable according to claim 1, wherein the body rod is provided with a connecting surface; the second connecting plug is arranged on the connecting surface; and the connecting surface is configured to abut against the connecting end surface of the electronic device.

3. The multi-functional charging data cable according to claim 2, wherein the connecting surface is provided with an anti-slip structure for increasing friction with the electronic device; and/or, the connecting surface is provided with a downwards recessed structure extending lengthwise, to receive the connecting end surface of the electronic device.

4. The multi-functional charging data cable according to claim 2, wherein the second connecting plug comprises a connecting platform protruding from the body rod and a plug portion arranged on the connecting platform; the connecting platform is configured to abut against the connecting end surface of the electronic device; and/or, the body rod is further provided with a supporting surface facing away from the connecting surface, and the supporting surface is provided with an anti-slip structure.

5. The multi-functional charging data cable according to claim 1, wherein a first end of the support rod is pivotally connected to the body rod; and a second end of the support rod is a free end and is allowed to pivot away from or toward the body rod.

6. The multi-functional charging data cable according to claim 5, wherein a pivotal connection point between the first end of the support rod and the body rod is located between the first end and the middle portion of the body rod; and/or, the support rod is pivotally connected to the body rod through a shaft pin.

7. The multi-functional charging data cable according to claim 5, wherein the body rod is provided with a receiving structure matching the support rod.

8. The multi-functional charging data cable according to claim 7, wherein a thickened operating block is arranged at the second end of the support rod, and the receiving structure is correspondingly provided with a receiving slot.

9. The multi-functional charging data cable according to claim 1, wherein the first connecting plug is configured as one of a universal serial bus (USB) plug or a Type-C plug; and/or, the second connecting plug is configured as one of a Micro USB plug, a Lightning plug, or a Type-C plug.

10. A charging device, comprising the multi-functional charging data cable according to claim 1 and a power adapter, wherein the power adapter is provided with a connecting socket matching the first connecting plug.

* * * * *